United States Patent [19]  [11] 3,959,574
Seanor et al.  [45] May 25, 1976

[54] BIASABLE MEMBER AND METHOD FOR MAKING

[75] Inventors: Donald A. Seanor, Pittsford; James A. Lentz, Penfield; Clifford O. Eddy, Webster; Stephen Strella, Pittsford, all of N.Y.

[73] Assignee: Xerox Corporation, Stamford, Conn.

[22] Filed: Apr. 26, 1974

[21] Appl. No.: 464,396

[52] U.S. Cl. .................................. 428/425; 29/132; 346/74 ES; 355/3 R; 427/24; 427/58; 428/36
[51] Int. Cl.² .................. G03G 13/00; G03G 15/00
[58] Field of Search ...... 96/1.4; 117/132 B, 161 KP, 117/94, 201, 218, 226, 227; 29/132; 355/3 R, 3 TR; 346/74 ES; 260/40 TN; 427/24, 58; 118/621, 637; 101/DIG. 13; 428/425, 36

[56] References Cited
UNITED STATES PATENTS

| 3,479,310 | 11/1969 | Dieterich et al. | 260/40 TN X |
| 3,697,171 | 10/1972 | Sullivan | 96/1.4 X |
| 3,702,482 | 11/1972 | Dolcimascolo et al. | 101/DIG. 13 X |
| 3,830,656 | 8/1974 | Takenaka et al. | 117/226 X |
| 3,832,055 | 8/1974 | Hamaker | 96/1.4 X |
| 3,863,603 | 2/1975 | Buckley et al. | 118/637 |

*Primary Examiner*—Ralph Husack
*Attorney, Agent, or Firm*—James J. Ralabate; Donald C. Kolasch; Ernest F. Chapman

[57] ABSTRACT

Rolls, belts and other biasable members having controlled resistivity are described. The resistivity of the elastomeric resilient polyurethane coating on biasable members is controlled by ionic additives incorporated in the polyurethane. Biasable members having at least one layer or coating of a hydrophilic elastomeric polyurethane containing resistivity altering compounds or agents have substantially reduced resistivity changes with changes in relative humidity. The utility of such biasable members is in the transfer of xerographic images from a photoconductor to a final support sheet where the member, for example, a bias transfer roll, electrically cooperates with a photoconductor to establish a directional force field therebetween.

31 Claims, 2 Drawing Figures

BIASABLE MEMBER AND METHOD FOR MAKING

BACKGROUND OF THE INVENTION

This invention relates to xerography and, more particularly relates to compositions and methods for making bias transfer rolls and belts for transferring xerographic toner images from one support surface to another.

In conventional xerography a photosensitive plate, which consists of a photoconductive coating placed over a conductive backing is charged uniformly and the charged plate is then exposed to a light image of an original. Under the influence of the light image the charge on the plate is selectively dissipated to record the original input information on the plate in the form of a latent electrostatic image. The latent image is developed, or made visible, by applying oppositely charged toner particles to the plate surface in a manner so that the toner particles are attracted into the imaged areas. The developed images are generally transferred from the photoconductor to a final support material, such as paper or the like, and affixed thereto to form a permanent record of the original.

Image transfer from the photoconductor to the final support material may be accomplished by means of a corona induction using a corona generator, or it may be accomplished by a roller or belt electrode biased to a certain potential, such electrode being referred to as a bias transfer member (roll or belt). The corotron system is relatively simple, but the charges deposited by the corotron electrostatically tack the final support material, such as paper, to the original toner support, such as, the photoconductor, in addition to creating the desired electric field affecting transfer of the toner to the paper. The strong attraction between the paper and the original toner support makes it mechanically difficult to separate or detack the two supports.

Transfer of developed images from the photoconductor to the final support material with the aid of a biased transfer member is not well known in the art, and such a member generally avoids severe tacking problems which are encountered when the corona induction system is utilized. Bias transfer members are well known in the art. A bias transfer roll is disclosed by Fitch in U.S. Pat. No. 2,807,233 where a metal roll coated with a resilient coating having a resistivity of about $10^6$ to $10^8$ ohm cm is used as a bias transfer member. Shelffo in U.S. Pat. No. 3,520,604 suggests that in order to create the proper environment for the duplicating mode, a transfer roll is used and is made of a conductive rubber having a resistivity in the range of from about $10^{11}$ to about $10^{16}$ ohm cm. A bias transfer member, that is, a member for electrically cooperating with a conductive support surface to attract electrically, charged particles from the support surface towards the member, is described by Dolcimascolo et al in U.S. Pat. No. 3,702,482. In Dolcimascolo et al, the bias transfer member has a conductive substrate for supporting a bias potential thereon, an intermediate blanket placed in contact with the substrate having an electrical resistivity capable of readily transmitting the bias potential on the substrate to the outer periphery of the blanket and a relatively thin outer coating placed over the blanket having an electrical resistivity to minimize ionization of the atmosphere when the transferred member is placed in electrical cooperation with the image support surface and provides a good toner release property enabling the device to be cleaned of the toner. A typical material for the relatively thin outer coating in accordance with Dolcimascolo et al, is one formulated of a material capable of providing a relatively smooth surface exhibiting relatively good mechanical release properties in respect to the toner materials employed. One such material is a polyurethane material manufactured by the duPont Company under the tradename "Adiprene".

The intermediate blanket of Dolcimascolo et al, also known as the relaxable layer, is preferably formed of a polyurethane rubber about 0.25 inch in thickness having sufficient resiliency to allow the roll to deform when brought into moving contact with the photoconductive drum surface to provide an extended contact region in which the toner particles can be transferred between the contacting bodies. However, the above-described biasable or bias transfer members are sensitive to changes in relative humidity. The heart of the bias transfer member is the thick resilient blanket or relaxable layer having a bulk resistivity falling in a well-defined operating range selected in relation to roll diameter and surface velocity. For these prior art systems the bulk resistivity of the blanket can vary over the range from about $10^7$ to about $10^{11}$ ohm cm. A variation in this resistivity of about two orders of magnitude, primarily as a result of static and dynamic changes in relative humidity, RH, (extending generally from 5 to 10 percent RH to 85 to 100 percent RH), is observed for the practical available commerical materials in this resistivity range. This variation in resistivity due to relative humidity effects the quality of image transferred from the photoconductor to the final support material. For this reason, it is desirable to provide biasable transfer members which are not effected by changes in relative humidity.

The polyurethane materials which are useful in forming the thick resilient blankets often have resistivities which are outside the acceptable resistivity limits for bias transfer members, i.e., about $10^7$ to about $5.0 \times 10^{11}$ ohm cm. Accordingly, it is desirable to utilize additives to control the resistivities of the elastomeric polyurethanes used in the manufacture of biasable transfer members. Normally, the resistivities of the elastomeric polyurethanes are too high for use in biasable transfer members, and they must be adjusted from the higher values to a suitable range, generally from about $10^7$ to about $5.0 \times 10^{11}$ ohm cm, so that the elastomeric polyurethane will transmit the bias potential from the substrate upon which it is coated, to the outer periphery of the elastomeric polyurethane.

OBJECTS OF THE INVENTION

Accordingly, it is an object of this invention to improve biasable transfer members used for electrically transferring a toner image from a photoconductive surface to a final support sheet.

Another object of this invention is to provide a method and composition for controlling the resistivity of biasable transfer members.

Another object of this invention is to provide a method and composition for adjusting the resistivity of an elastomeric polyurethane from higher resistivity values to resistivities within the range of about $10^7$ to about $5.0 \times 10^{11}$ ohm cm, so that the elastomeric polyurethane will transmit the bias potential from the substrate upon which it is coated, to the outer periphery of the elastomeric polyurethane.

It is another object of this invention to provide compositions and methods for making biasable transfer members wherein the changes in resistivity of the biasable member due to variations in relative humidity are reduced.

A further object of this invention is to provide a bias transfer roll having a resilient elastomeric layer, the sensitivity of the resistivity of which is significantly reduced when changes in relative humidity occur.

SUMMARY OF THE INVENTION

These and other objects of the invention are attained by means of a biasable transfer member, that is, a member capable of electrically cooperating with a conductive support surface to attract charged toner particles from the support surface towards the member, the member having at least one layer comprising an elastomeric polyurethane containing additives which control the resistivity. In addition to controlling the resistivity, it was unexpectedly found that when a biasable transfer member comprises a conductive substrate for supporting a uniform bias thereon and at least one coating of elastomeric polyurethane having an additive therein, and preferably a quaternary ammonium compound therein, the coating being placed over the conductive substrate, the resistivity-control additive reduces the sensitivity of the resistivity to changes in relative humidity. In fact, when the elastomeric polyurethanes are of the type which are hydrophilic in nature, that is, those which have a strong affinity for binding or absorbing water, by incorporating the additives and more preferably quaternary ammonium compound additives in the hydrophilic elastomeric polyurethane, there is a substantial reduction in the sensitivity of the resistivity to changes in relative humidity. Thus, in accordance with the present invention there is provided a method of not only controlling the resistivity of a biasable transfer member but also reducing the sensitivity of the resistivity of biasable transfer members to changes in relative humidity by coating a conductive substrate for supporting a uniform bias potential, with at least one layer of an elastomeric polyurethane having resistivity-control additive thereon. Optionally, the elastomeric polyurethane may be coated with a thin outer coating of an elastomeric material to minimize ionization of the atmosphere in and about the contact region.

By the use of the term "biasable transfer member" or "bias transfer roll" is meant a member or roll for electrically cooperating with a conductive support surface to attract electrically, charged particles from the support surface towards the member. More specifically, a bias transfer roll is one which electrically cooperates with a photoconductive plate when brought into contact therewith, to attract charged toner particles from the plate in the direction of the roll. In this manner, the developed images are transferred from the photoconductor to a final support material, such as paper or the like.

For a better understanding of the invention as well as other objects and further features thereof, reference is had to the following detailed description of the invention to be read in connection with the accompanying drawings.

DESCRIPTION OF THE PREFERRED EMBODIMENTS

The biasable transfer members of the present invention have application in any number of xerographic devices in which a transfer member, and more particularly, a bias transfer roll, is used for electrically cooperating with a photoconductive plate when brought into contact therewith to attract charged toner particles from the plate toward the roll. The utility of such a biased roll transfer mechanism is described by Dolcimascolo et al in U.S. Pat. No. 3,702,482 issued Nov. 7, 1972 and incorporated herein by reference. Therein is claimed a transfer member for electrically cooperating with a conductive support surface to electrically attract charged particles from the support surface towards the member including a conductive substrate for supporting a uniform bias potential thereon, an intermediate, resilient blanket placed in contact with said substrate having an electrical resistivity such that the blanket is capable of transmitting said bias potential on said substrate to the outer periphery of said blanket, and an outer coating placed over said blanket having an electrical resistivity to minimize ionization of the surrounding atmosphere when said transfer member is placed in electrical cooperation with said support surface. A polyurethane material manufactured by the duPont Company under the tradename Adiprene is suggested therein as an outer coating of a roll capable of providing a relatively smooth surface and exhibiting relatively good mechanical release properties in respect to the toner material employed, the elastomeric material being approximately 0.0025 inch in thickness and having a hardness of between 15–25 durometers, preferably a polyurethane rubber approximately 0.25 inch in thickness, and preferably having a resistivity of between $10^9$ and $10^{10}$ ohm cm.

Figure 1:
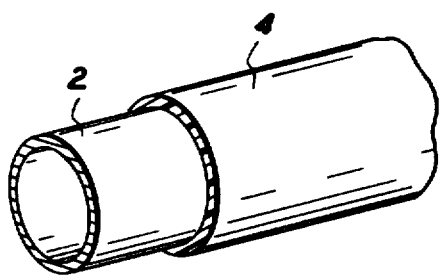
FIG. 1 is a perspective view in partial section showing the construction of a bias transfer roll having an elastomeric polyurethane containing an ionic additive coated upon a conductive substrate.

Referring now specifically to FIG. 1, there is shown a cut-away view of a transfer member clearly illustrating the internal construction thereof. The transfer member is in the form of a roll and is basically formed upon a rigid hollow cylinder 2 that is fabricated of a conductive metal, such as aluminum, copper or the like, capable of readily responding to a biasing potential placed thereon. Over core 2 is placed a coating 4 which is an elastomeric polyurethane containing an additive capable of altering or controlling the resistivity to within the preferred resistivity range. Outer coating 4 which is formed of the resilient elastomeric material is preferably about 0.25 inch in thickness having a hardness between about 40 Shore 00 to about 40 Shore A and preferably about 15–25 durometers. Where coating 4 minimizes ionization of the atmosphere in and about the contact region of the bias transfer member with the photoconductor; where it has suitable mechanical stability; and where it is easy to clean, the elastomeric polyurethane having the additive to control or alter the resistivity may be the outermost coating on the bias transfer member. It is preferred that the resilient elastomeric polyurethane have a resistivity of between about $10^7$ and $5.0 \times 10^{11}$ ohm cm. This is reached or controlled by adding the additive to the polyurethane. In accordance with the present invention, the coating of the conductive substrate must be formulated of at least one layer of an elastomeric polyurethane having as an additive a compound capable of altering the resistivity to within the preferred resistivity range. By coating the biasable transfer member (roll) with this particular class of polyurethanes, resistivity of the biasable transfer roll is controlled, and sensitivity of the resistivity of the biasable transfer roll is also controlled in relationship to changes in relative humidity, and more specifically, when the polyurethane of this invention is a hydrophilic polyurethane, sensitivity of the resistivity is substantially reduced when changes in relative humidity occur. Thus, the resistivity of the elastomeric polyurethanes having additives to control the resistivity, and more preferably quaternary ammonium compound additives used as the outer coating of the bias transfer member of FIG. 1, is less sensitive to changes in relative humidity than the elastomeric polyurethanes which are not treated with such additives. Examples of the elastomeric polyurethane materials having additives incorporated therein in accordance with the present invention to control the resistivity are given infra.

Figure 2:
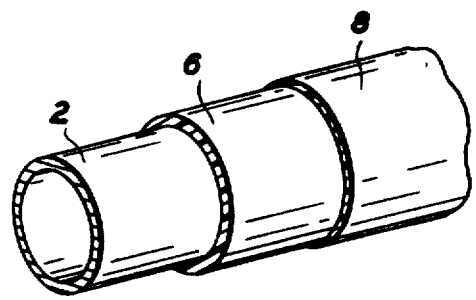
FIG. 2 is a perspective view in partial section showing the construction of a bias transfer roll having an elastomeric resilient blanket or relaxable layer intermediate the conductive substrate and a relatively thin outer coating, the relaxable layer being an elastomeric polyurethane having an ionic additive therein.

Referring now to FIG. 2, wherein there is shown a cutaway view of a biasable transfer roll and a clear illustration of the internal construction thereon, there is shown a rigid hollow cylinder 2 that is fabricated of a conductive metal, as in FIG. 1, capable of readily responding to a biasing potential placed thereon. Over the rigid hollow cylinder 2 is placed a relatively thick resilient intermediate blanket 6 of elastomeric polyurethane material having an additive to control the resistivity and having a hardness of between about 40 Shore 00 and about 40 Shore A. The elastomeric polyurethane may be about 0.125 inch to about 0.625 inch in thickness and is preferably 0.25 inch in thickness, having sufficient resiliency to allow the roll to deform when brought into moving contact with the photoconductive drum surface to provide an extended contact region in which the toner particles can be transferred between the contacting bodies. Intermediate blanket 6, which is comparable to layer 4 in FIG. 1, should be capable of responding rapidly to the biasing potential to impart electrically the charge potential on the core to the outer extremeties of the roll surface. The blanket therefore should have a resistivity of between about $10^7$ and $5.0 \times 10^{11}$ ohm cm, and preferably about $10^9$ to about $10^{10}$ ohm cm. Over the intermediate blanket 6 is placed a relatively thin outer coating 8 which according to the prior art bias transfer rolls, may be an elastomeric material such as a polyurethane having a resistivity of between $10^{10}$ and $10^{15}$ ohm cm and which preferably has a thickness of about 0.0025 inch and a hardness of about 65-75 D durometer. Ionization of the atmosphere in and about the contact region is minimized in accordance with the discussion set forth above relating to the resistivity of the outer coating.

The outer layer 8, known also as a self-leveling layer, is a leaky insulator, and is generally selected for its substantially higher resistive values than those of resilient blanket (relaxable layer) 6. In addition, outer layer 8 includes materials, or is so related to relaxable layer 6, such that charges applied to the outer surface of layer 8 will be generally dissipated within one revolution of the roll. Layer 8 also acts as a thin insulating layer to help protect resilient blanket 6 during air breakdown, to limit current flow through the roll, and to make the roll surface easy to clean. When the relaxable material, i.e., the resilient elastomeric polyurethane having the resistivity-altering compound additives of the present invention therein, is durable and cleanable, layer 8 is not required, and the roll of FIG. 1 may be used as a biasable transfer member. Furthermore, in accordance with the present invention, relative humidity sensitivity of the resistivity is substantially reduced, and outer layer 8 need not act as a moisture barrier to prevent resistivity changes in resilient blanket 6 due to changes in relative humidity. Thus, when the biasable transfer members of this invention are coated with at least one layer of an elastomeric polyurethane having certain additives incorporated therein in accordance with the present invention, the resistivity thereof is controlled, and even when there are substantial changes in the relative humidity, the resistivity sensitivity thereto is reduced.

All elastomeric polyurethanes which have a desirable hardness can be used in accordance with the present invention as long as the resistivity of the polyurethane can be adjusted to the desired resistivity which is about $10^7$ to about $5.0 \times 10^{11}$. By adjusting, altering or controlling the resistivity is meant to change the resistivity either by reducing or decreasing it or by increasing it to the desired measurement. Furthermore, the ionic additives can be used to alter or control the resistivity of those polyurethane elastomers having resistivities within the desired range wherein it is deemed desirable to increase or decrease the resistivity merely within the range. The elastomeric polyurethanes can be those which are hydrophilic in nature or hydrophobic in nature.

The elastomeric polyurethanes of the present invention for making biasable transfer members by coating a conductive substrate for supporting a uniform bias potential thereon with at least one coating of the elastomeric polyurethane, may be those which are generally designated as hydrophilic in nature and have a tendency to attract, absorb and/or retain water. Characteristic of this class of polyurethane are the conventional polyester-based polyurethanes, for example, polyethylene sebacate polyurethane. The most common monomers used in polyesters for the urethane polymers of this class are adipic acid, phthalic anhydride, ethylene glycol, propylene glycol, 1,3-butylene glycol, 1,4-butylene glycol, and diethylene glycol. Branched polyesters used for monomers in synthesis of polyurethanes of the class used in this invention include the triols such as 1,2,6-hexanetriol, trimethylolpropane, and 1,1,1-trimethylolthane.

The polycondensation reactions leading to the formation of the elastomeric polyurethanes of this invention are influenced by a number of factors, prominent among which are the structure of the isocyanate, including its functionality and the type and location of substituents; the structure of the polyhydroxy compound; the solvent used and the dilution of the system; the presence of impurities; and the temperature, particularly above about 100°C. One skilled in the art can adjust these parameters to prepare suitable elastomeric polyurethanes having the above-described properties for the embodiments of FIGS. 1 and 2. It is this class of elastomeric polyurethanes, that is, the hydrophilic elastomeric polyurethanes, in which the sensitivity of the resistivity to changes in relative humidity is significantly reduced when the additives of the present invention, and particularly the ionic additives such as the quaternary ammonium compound additives, are incorporated therein. By a significant reduction in the sensitivity of the resistivity to changes in relative humidity is meant a reduction in sensitivity of at least about 10 percent. Reductions in relative humidity sensitivity of greater than 50 percent have been demonstrated by the methods and compositions of the present invention.

The relative humidity sensitivities of the elastomeric polyurethanes of the present invention for making biasable transfer members by coating a conductive subserate for supporting a uniform bias potential thereon with at least one coating of the elastomeric polyurethane of the present invention, have been obtained by measuring the resistivity of the elastomeric polyurethane at a relative humidity of 10 percent and a relative humidity of 80 percent. The ratio of the resistivity at a relative humidity of 10 percent to the resistivity at a relative humidity of 80 percent is the relative humidity sensitivity. This relative humidity sensitivity is also referred to as the relative humidity swing. In addition to the desirability of having low relative humidity swing, the elastomeric polyurethanes useful for biasable transfer members must also have a resistivity of between about $10^8$ and $10^{11}$ ohm cm. In the event the elastomeric polyurethanes have a resistivity higher or lower than the desired resistivity, the resistivity may be adjusted by the addition of a suitable additive or combination of additives for adjusting the resistivity of the particular polyurethane. For example, a particular elastomeric polyurethane may have a resistivity of $10^{14}$ ohm cm. By the use of, for example, a quaternary ammonium compound in accordance with the present invention, that resistivity may be reduced from $10^{14}$ to within the range of $10^8$ to $10^{11}$. In accordance with the discussion above, these additives also have a favorable effect upon the RH sensitivity.

Other elastomeric polyurethanes suitable for the manufacture of biasable transfer members, the resistivity of which may be controlled by incorporating certain ionic or polar or other additives therein, are those which are "hydrophobic" in nature and comprise a largely hydrocarbon structure with few polar groups to absorb water. The characteristics of this class of polyurethanes is set forth in our copending patent application Ser. No. 464,397 filed herewith. By use of the term hydrophobic is meant that class of polyurethanes having a chemical structure which does not form bonds or significantly interact with water, i.e., due to their functionality, they substantially exclude water.

Examples of the hydrophobic elastomeric polyurethanes are the reaction product of polybutadiene polyol and a diisocyanate; the reaction product of castor oil and 2,4-tolylene diisocyanate; the reaction product of a diisocyanate and polyalkylene ether glycol; the reaction product of a diisocyanate and the hydroxy-terminated polyester of a dimer acid; and the reaction product of a diisocyanate and a hydroxy-terminated butadiene-acrylonitrile copolymer.

The additives which are incorporated in the elastomeric polyurethanes in accordance with the present invention, for controlling the resistivity may be ionic or polar, and the like or mixtures thereof and include organic dyes, organic pigments, organic salts, polyelectrolytes, inorganic salts, plasticizers, inorganic pigments, metallic particles and charge transfer complexes or materials which produce charge transfer complexes with the elastomeric polyurethane. In a preferred embodiment, the additives not only control the resistivity of the elastomeric polyurethanes used for coating the conductive substrate of biasable transfer members, but also substantially reduce the sensitivity of the resistivity of that class of elastomeric polyurethane materials which are described above as "hydrophilic" elastomeric polyurethanes, examples of which are the conventional polyester-based elastomeric polyurethanes such as those derived from sebacic acid and diethylene glycol. Any amount of the additive sufficient to adjust the resistivity of the elastomeric polyurethane to desirable limits, preferably from higher or lower levels of resistivity to a resistivity in the range from about $10^7$ to about $5.0 \times 10^{11}$ ohm cm, or within the range itself, may be used in accordance with the present invention. The most preferred amount of additive to be incorporated within the elastomeric polyurethane, is about 0.01 percent (by weight) to about 6.0 percent (by weight) based upon the weight of the elastomeric polyurethane. Higher amounts of the additive to control resistivity may be used, the only limitation being the desired resistivity of the elastomeric polyurethane for use as a coating material upon the conductive substrate of a biasable transfer member.

In order to be effective as additives for reducing the resistivity of the elastomeric polyurethanes in accordance with the present invention, the additives must be soluble in or dispersible in the elastomeric polyurethane. The additives may be worked into the polyurethane material by any suitable manner known to those skilled in the art, including direct milling of the additive into the polyurethane, incorporating a solution or dispersion of the additive in a suitable solvent or dispersing medium in the polyurethane, and the like. The preferred additives are those which are soluble in the polyurethane. The additives of the present invention must also not cause gelation of the polyurethane in the effective amount incorporated in the polyurethane to decrease or increase the resistivity to the desired level.

Examples of the additives which may be used to control (increase or decrease) the resistivity of the elastomeric polyurethanes in accordance with the present invention include the organic dyes which are ionic or polar in nature, such as, rhodamine B (C.I. No. 45170) and soluble derivatives of copper phthalocyamine. Examples of suitable organic pigments which may be used to control resistivity include carbon blacks and carbonaceous fibers. The organic salts are generally preferred in accordance with the present invention and include the quaternary ammonium compounds.

Examples of quaternary ammonium compounds which may be used in controlling the resistivity of the elastomeric polyurethanes, and for reducing the sensitivity of the resistivity of the hydrophilic polyurethanes to changes in relative humidity include tetraheptyl ammonium bromide, trimethyloctadecylammonium chloride, benzyltrimethylammonium chloride, and the like. Generally, most of the reaction products of the tertiary amines with alkyl halides may be used in accordance with the present invention where the reaction product thereof has the following formula:

where $R_1$, $R_2$, $R_3$, and $R_4$ may be alike or different, may be substituted or unsubstituted, may be branched-chain or unbranched, and may be saturated or unsaturated, and where X may be any of the halogens, and preferably may be bromine or chlorine. Any one or more of the R groups may also comprise a cyclic structure such as phenyl or benzyl and the like.

Polyelectrolytes, such as, salts of acrylic acid, acrylic acid copolymers and sulfonated polystyrene and the like may also be incorporated in the elastomeric polyurethanes as additives to control the resistivity in accordance with the present invention. Examples of inorganic salts which may be used as additives to control the resistivity of the elastomeric polyurethanes are lithium iodide, lithium thiocyanate, sodium chloride, potassium chloride, cuprous chloride and the like.

Plasticizers can also be used to control the resistivity of the elastomeric polyurethanes as well as the control the resistivity. Examples of suitable plasticizers include dioctylphthalate, tricresyl phosphate, chlorinated polyphenyls, triphenyl phosphate, hexamethylphosphoramide and N-ethyl toluene sulfonamide and the like. Inorganic pigments, such as barium titanate, asbestos, cadmium sulfide, and cadmium sulfocyanide and the like are also effective as resistivity control agents in accordance with the present invention.

Metallic particles such as copper, silver, nickel and the like may be incorporated in the polyurethanes in accordance with the present invention to control resistivity.

Examples of other additives used to control resistivity in accordance with the present invention are the charge transfer complexes. These may include, for example, morpholinium tetracyanoquinodimethane, tetracyanoquinodimethane (TCNQ), lithium tetracyanoquinodimethane, chloranil dimethyl aniline and the like.

In accordance with the present invention, other additives may also be used which will not interfere with the relative humidity sensitivity or swing or with the resistivity of the polyurethane in general. These include certain plasticizers (mentioned supra), antioxidants, and the like.

As described supra, the hardness of the elastomeric polyurethanes of the present invention is between about 40 Shore 00 and about 40 Shore A, and preferably about 10–20 Shore A. The control of the hardness is within the purview of those skilled in the art, and the hardness can be controlled by such parameters as by varying the type of reactants utilized, and by using various additives such as plasticizers.

In accordance with the present invention, there is described the method of controlling the resistivity of a biasable transfer member. There is also described a method of reducing the sensitivity of the resistivity of the hydrophilic elastomeric polyurethane to changes in relative humidity by coating a conductive substrate for supporting a uniform bias potential thereon with at least one layer of a hydrophilic elastomeric polyurethane having an additive therein to control resistivity and preferably a quaternary ammonium compound additive therein and having a resistivity of about $10^7$ to about $5.0 \times 10^{11}$ ohm cm. The RH swing has been discussed above. The coating can be applied to the substrate by any sutable method or technique known in the art, including spraying, casting in molds, affixing sheets of the material to the substrate member by suitable mechanical means or by suitable cements, and the like.

The following specific examples illustrate more clearly elastomeric polyurethane materials which may be used in preparing the biasable transfer members and for controlling the resistivity of biasable transfer members, including the unexpected result of controlling the sensitivity of the resistivity to changes in relative humidity, although the invention is not to be construed as limited in its scope thereby.

SAMPLE PREPARATION

Slabs of the particular elastomeric polyurethane to be tested were cast in sheets a thickness of about 0.125 inch. Samples of the various cast materials were placed in controlled humidity chambers for a designated number of days. One set of chambers was maintained at a relative humidity of 10 percent and another set of chambers was maintained at a relative humidity of 80 percent. The samples were suspended in the chambers in such a way that both sides were available to the atmosphere. In this manner the samples would have taken up very close to the equilibrium amounts of water within 14 days. Resistivities were measured by standard techniques, as by the AC bridge, relaxation techniques and the steady state techniques for determining resistivity. These conventional methods are well known to those skilled in the art. For example, in the relaxation technique for determining resistivity, the method consists of using a calibrated probe having a known beta, and placing it on the bias roll or slab surface. A known potential is applied to the other side of the slab or surface, and charge relaxation through the polyurethane is monitored by tracing the rise in probe potential. This is conveniently done by using a storage scope.

AC resistivity was measured at 1000 Hz using a General Radio Model 1615A capacitance bridge and a Type 1690 A (Hartshorn type) dielectric sample holder. Samples were die-cut, 2-inch diameter discs. Tin foil electrodes were placed on the samples.

The resistivities measured at both 10 percent and 80 percent relative humidity were recorded. For the designated examples below, the ratio of the resistivity at 10 percent relative humidity to the resistivity at 80 percent relative humidity was determined. The resulting ratio is designated as the RH sensitivity or RH swing and is reported as RH sensitivity in Table I below where resistivity at 10 percent and 80 percent relative humidities is also designated for the various samples tested.

EXAMPLES I AND II

Polyurethane prepared from hydroxy terminated polybutadiene polyol (Arco polyol resin supplied by Acro Chemical Co.) and a diisocyanate (DDI 1420 supplied by General Mills) is shown in Table I, Example I. The polybutadiene polyol comprised about 80 percent (by weight) of the product and the diisocyanate comprised about 20 percent (by weight) of the product. The ingredients were mixed in the presence of 1.2 percent (by weight) conventional catalysts at 100°C. The resistivities were measured as described above at the two designated relative humidities and the relative humidity sensitivity was determined after an equilibration time of 14 days in a relative humidity chamber.

An additive, tetraheptyl ammonium bromide, was added to the product prepared in accordance with Example I, in quantities of 1 percent and 2 percent (by weight) respectively. The reduction in the resistivity of the polyurethane elastomer is shown in Table I. No reduction in RH sensitivity was observed.

EXAMPLES III and IV

A hydrophobic elastomeric polyurethane was prepared from castor oil (DB oil supplied by Baker Castor Oil Co.) and 2,4-tolylene diisocyanate. The components were mixed while heated at 60°–65°C. The resistivities of the polyurethanes were measured and the RH sensitivity was determined. The equilibration time in days is also shown in Table I below. Hardness was 16 Shore A. Example IV was prepared in accordance with Example III except 1 percent and 2 percent of a tetraheptyl ammonium bromide additive was used to control the resistivity of the respective polyurethanes. The reduction in resistivity by use of the respective quantities of additive is shown clearly in Table I below as well as the resulting reduction in RH sensitivity.

EXAMPLES V AND VI

A polyester based polyurethane, derived from the reaction product of sebacic acid and diethylene glycol, was cast into 0.125 inch thick slabs as discussed above. The resistivity of the elastomeric polyurethane was measured at 10 percent and 80 percent after an equilibration time of 14 days in the humidity chambers. The RH sensitivity for this elastomeric polyurethane was determined by the AC method. Example VI was prepared in accordance with Example V except 0.02 percent of tetraheptyl ammonium bromide additive was added to the polyester based polyurethane to control the resistivity of the polyurethane. The reduction in resistivity by the use of the additive is shown in Table I below. The relative humidity sensitivity of the polyester-based polyurethane containing the tetraheptyl ammonium bromide additive was also determined. A comparison of the relative humidity sensitivities of the polyester-based polyurethane of Example V compared with the polyester-based polyurethanes of Example VI clearly shows the substantial reduction in RH sensitivity when the quaternary ammonium compound additive is used to control the resistivity of these elastomeric polyurethanes which are hydrophilic in nature.

pound additives have reduced resistivities when such compounds are incorporated therein. Furthermore, significant or substantial reductions in relative humidity sensitivity of the elastomeric polyurethanes of a hydrophilic nature have been shown when quaternary ammonium compound additives are incorporated therein. Thus, by using the elastomeric polyurethanes of the present invention, the resistivity of the compositions for making biasable transfer members has been reduced. The resistivity of bias transfer rolls having a resilient elastomeric polyurethane layer has been reduced in accordance with the present invention. Furthermore, the sensitivity of the resistivity of the bias transfer rolls having a coating of a resilient elastomeric hydrophilic polyurethane thereon, to changes in relative humidity, have been substantially reduced.

While this invention has been disclosed with reference to the structure and compositions disclosed herein, it is not necessarily confined to the details as set forth, and this application is intended to cover such modifications or changes as may come within the scope of the following claims.

What is claimed is:

1. A member for electrically cooperating with a photoconductive surface to attract charged toner particles from the surface towards the member comprising a conductive substrate for supporting a uniform bias potential thereon and at least one coating comprising a resilient elastomeric polyurethane having an additive therein for controlling the resistivity of the elastomeric polyurethane, the coating being in contact with the conductive substrate, and having an electrical resistivity such that the coating is capable of transmitting a bias potential from the substrate to the outer periphery of the coating.

2. The member of claim 1 further comprising an outer coating placed over the elastomeric polyurethane coating, the elastomeric polyurethane being resilient, whereby the elastomeric polyurethane coating forms a resilient blanket in contact with the conductive substrate, said blanket having an electrical resistivity capable of transmitting a bias potential from the substrate to the outer periphery of the blanket.

3. The member of claim 2 wherein the outer coating is formed of elastomeric material having a resistivity of between about $10^{10}$ and $10^{15}$ ohm cm.

TABLE I

HUMIDITY SENSITIVITIES OF VARIOUS POLYURETHANE ELASTOMERS

| EXAMPLE | ELASTOMER | RESISTIVITY AT DESIGNATED RELATIVE HUMIDITY | | TIME (Days) | RH SENSITIVITY |
|---|---|---|---|---|---|
| | | 10% | 80% | | |
| I | Polybd - DDI | $3.1 \times 10^{14}$ | $1.8 \times 10^{14}$ | 14 | 1.7 |
| II | Polybd - DDI | | | | |
| | a. 1% additive | $4.1 \times 10^{10}$ | $2.4 \times 10^{10}$ | 14 | 1.7 |
| | b. 2% additive | $8.5 \times 10^{9}$ | $4.3 \times 10^{9}$ | | 1.8 |
| III | Castor Oil-TDI based polyurethane | $2.0 \times 10^{13}$ | $4.6 \times 10^{12}$ | 6 | 4.3 |
| IV | As III with | | | | |
| | a. 1% additive | $3.1 \times 10^{10}$ | $9.4 \times 10^{9}$ | 14 | 3.3 |
| | b. 2% additive | $1.1 \times 10^{10}$ | $2.7 \times 10^{9}$ | 14 | 4.1 |
| V | Polyester polyurethane | $2.2 \times 10^{10}$ | $4.7 \times 10^{8}$ | 14 | 47 |
| VI | As V with a 0.02% additive | $3.5 \times 10^{9}$ | $1.7 \times 10^{8}$ | 14 | 21 |

The objects of the present invention have been amply demonstrated by the above examples. Elastomeric polyurethanes containing quaternary ammonium com- 4. The member of claim 1 wherein the elastomeric polyurethane coating has a resistivity of between about $10^7$ and about $5.0 \times 10^{11}$ ohm cm.

5. The member of claim 1 wherein the elastomeric polyurethane has a hardness of between about 40 Shore 00 and about 40 Shore A.

6. The member of claim 1 wherein the conductive substrate having a coating of elastomeric polyurethane is formed of a conductive metal in the shape of an endless belt.

7. The member of claim 1 wherein the additive for controlling the resistivity is selected from the group consisting of polar or ionic organic dyes, organic pigments, organic salts, polyelectrolytes, inorganic salts, plasticizers, inorganic pigments, metallic particles, charge transfer complexes and compounds which produce charge transfer complexes with the elastomeric polyurethanes.

8. The member of claim 1 wherein the elastomeric polyurethane has about 0.01 percent to about 6.0 percent additive.

9. The member of claim 1 wherein the additive is a quaternary ammonium compound.

10. The member of claim 1 wherein the elastomeric polyurethane is hydrophilic and the additive for controlling the resistivity substantially reduces the sensitivity of the resistivity to changes in relative humidity.

11. A method of controlling the resistivity of a member for electrically cooperating with a photoconductive surface to attract charged toner particles from the surface towards the member, comprising coating a conductive substrate for supporting a uniform bias potential thereon with at least one layer of a resilient elastomeric polyurethane having at least one additive incorporated therein to alter the resistivity of the elastomeric polyurethane, whereby the elastomeric polyurethane having an altered resistivity is capable of transmitting a bias potential from the substrate to the outer periphery thereof.

12. A method in accordance with claim 11 wherein the resistivity of the elastomeric polyurethane having the additive incorporated therein is about $10^7$ to about $5.0 \times 10^{11}$ ohm cm.

13. A method in accordance with claim 11 wherein the resistivity is increased.

14. A method in accordance with claim 11 wherein the resistivity is decreased.

15. A method in accordance with claim 11 comprising incorporating about 0.01 percent to about 6.0 percent additive in the elastomeric polyurethane.

16. A method in accordance with claim 11 further comprising coating the elastomeric polyurethane having the additive therein, with an outer coating whereby the elastomeric polyurethane forms a resilient blanket in contact with the substrate and having an electrical resistivity such that the blanket is capable of transmitting the bias potential on the substrate to the outer periphery of the blanket.

17. A method in accordance with claim 11 further comprising substantially reducing the sensitivity of the resistivity of the member to changes in relative humidity when the elastomeric polyurethane is hydrophilic and the additive is a quaternary ammonium compound.

18. A roll for electrically cooperating with a photoconductive plate when brought into contact therewith to attract charged toner particles from the plate toward the roll comprising a rigid cylindrical core of electrically conductive material having at least one coating of a resilient elastomeric polyurethane having an additive therein to control the resistivity of the elastomeric polyurethane, and having an electrical resistivity such that the coating is capable of transmitting a bias potential from the core of electrically conductive material to the outer periphery of the coating.

19. The roll of claim 18 further comprising an outer resilient coating placed over the elastomeric polyurethane having an additive incorporated therein, the coating having a resistivity to minimize ionization of the surrounding atmosphere in and about the zone of contact between the transfer roll and the photoconductive plate.

20. The roll of claim 19 wherein the outer coating has a resistivity of between about $10^{10}$ and about $10^{15}$ ohm cm.

21. The roll of claim 18 wherein the resilient elastomeric polyurethane having the additive incorporated therein, has a resistivity of between about $10^7$ and $5.0 \times 10^{11}$ ohm cm.

22. The roll of claim 18 wherein the additive for controlling the resistivity is selected from the group consisting of polar or ionic organic dyes, organic pigments, organic salts, polyelectrolytes, inorganic salts, plasticizers, inorganic pigments, metallic particles, charge transfer complexes and compounds which produce charge transfer complexes with the elastomeric polyurethanes.

23. The roll of claim 18 wherein about 0.01 percent to about 6.0 percent additive is incorporated in the elastomeric polyurethane.

24. The roll of claim 18 wherein the additive is a quaternary ammonium compound.

25. The roll of claim 18 wherein the elastomeric polyurethane is hydrophilic and the additive for controlling the resistivity substantially reduces the sensitivity of the resistivity to changes in relative humidity.

26. A method of preventing changes in the resistivity of members for electrically cooperating with a photoconductive surface to attract charged toner particles from the surface towards the members caused by changes in relative humidity comprising adding a quaternary ammonium compound to a resilient hydrophilic elastomeric polyurethane and applying at least one coating of said polyurethane to a cylindrical core of electrically conductive material for electrically cooperating with the photoconductive surface when brought into contact therewith, whereby the elastomer is capable of transmitting a bias potential from the core of electrically conductive material to the outer periphery thereof and significant reductions in the sensitivity of the resistivity to changes in relative humidity occur.

27. The method of claim 26 wherein about 0.01 percent to about 6.0 percent of the quaternary ammonium compound is incorporated in the elastomeric polyurethane.

28. The method in accordance with claim 26 further comprising applying an outer coating of an elastomeric polyurethane over the elastomeric polyurethane having the quaternary ammonium compound incorporated therein whereby the elastomeric polyurethane having the quaternary ammonium compound incorporated therein forms a resilient blanket having an electrical resistivity such that the blanket is capable of transmitting the bias potential from the conductive core to the outer periphery of the blanket, the outer coating having a resistivity of about $10^{10}$ to about $10^{15}$ ohm cm and the elastomeric polyurethane resilient blanket having a resistivity of about $10^7$ to about $5.0 \times 10^{11}$ ohm cm.

29. The method of claim 26 wherein the quaternary ammonium compound is tetraheptyl ammonium bromide.

30. The method of claim 26 wherein the quaternary ammonium compound is trimethyloctadecylammonium chloride.

31. The method of claim 26 wherein the quaternary ammonium compound is benzyltrimethylammonium chloride.

* * * * *